LÉON DE VRIENDT AND LOUIS DE VRIENDT.
LIQUID LEVEL GAGE.
APPLICATION FILED DEC. 10, 1919.
1,378,768.  
Patented May 17, 1921.
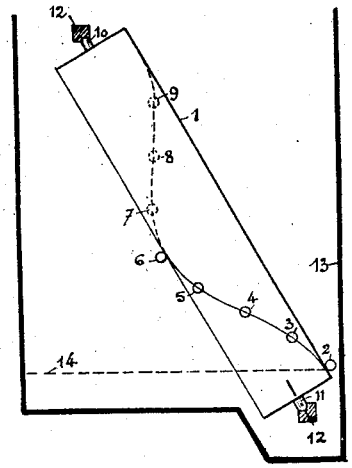
Fig. 1.
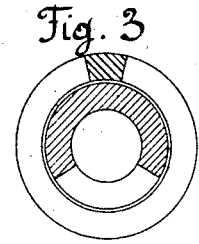
Fig. 3.
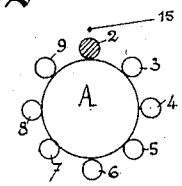
Fig. 2.
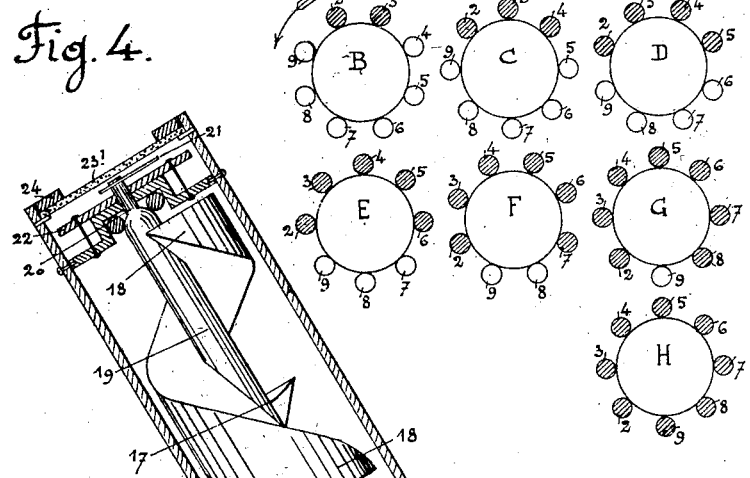
Fig. 4.
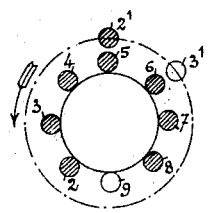
Fig. 3.
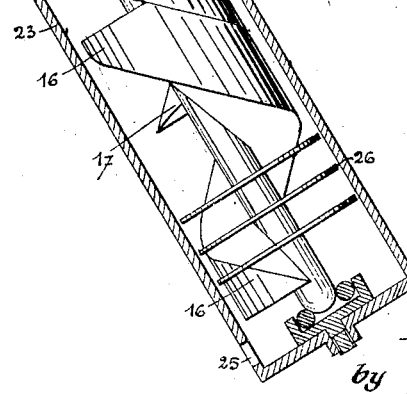
Inventors  
Léon De Vriendt  
and  
Louis De Vriendt  
by his Atty.

UNITED STATES PATENT OFFICE.

LEON DE VRIENDT AND LOUIS DE VRIENDT, OF BLANKENBERGHE, BELGIUM.

LIQUID-LEVEL GAGE.

1,378,768.　　　　Specification of Letters Patent.　　Patented May 17, 1921.

Application filed December 10, 1919. Serial No. 343,906.

*To all whom it may concern:*

Be it known that we, LEON DE VRIENDT and LOUIS DE VRIENDT, subjects of the Kingdom of Belgium, residing at Blankenberghe, Belgium, have invented certain new and useful Improvements in Liquid-Level Gages, of which the following is a specification.

The invention relates to an apparatus actuated by the level variations of a fluid, and capable in such actuation to be used to indicate the fluid level.

The improved apparatus includes an element mounted for rotation and inclined with respect to the level of the liquid in which it is to be immersed. A series of bodies are arranged about the element in such order with relation to each other and to the element that said element, while not immersed remains in a state of predetermined equilibrium and that as said bodies are successively immersed, due to the change in level of the fluid, the element operates to a new position of equilibrium. If the element is mounted for rotation, as is contemplated, the change in position by the succession of different states of equilibrium, either in the ascending or descending fluid level, will transmit a rotating movement to the element, which by suitable mechanism may be caused to indicate the fluid level.

In the drawings:—

Figure 1 is a substantially diagrammatic view illustrating the application of the invention to a fluid level indicator.

Fig. 2 represents plan views of the element in the successive states of equilibrium incident to the immersion of the successive bodies on said element, the immersed bodies being indicated by section lining in the respective views.

Fig. 3 is an end view of the element illustrating the application thereto of a second series of bodies.

Fig. 3' is a sectional view of the element showing two series of bodies of different form than those shown in Figs. 1, 2 and 3.

Fig. 4 is an elevation of a commercial type of apparatus in accordance with this invention, the casing therefor being shown in section.

With particular reference to Figs. 1 and 2, the element 1, here shown as a cylindrical body is provided with a plurality of relatively fixed spherical bodies 2, 3, 4, 5, 6, 7, 8 and 9, arranged on a helical line lengthwise the element. The element is shown as provided with axial journals 10 and 11 mounted in bearings 12, arranged in a fluid tank 13, the axial line of the element being at an incline to the level of the fluid. Assuming the level of the fluid to be at 14, that is just below the lowermost spherical body 2, the element 1 is held in a predetermined position of equilibrium. As the initialed body 2 is immersed, the element 1 obviously seeks a new state of equilibrium, and this can only result in a rotative movement of the element. Assuming such new position as indicated at 15 in drawing *a* of Fig. 2, it will be apparent that immersion of the succeeding bodies will result in the successive positions indicated in said Fig. 2 at *b*, *c*, *d*, *f*, *g* respectively. From the indication at *h* Fig. 2, it is apparent that the immersion of the spherical body 9 cannot produce additional rotation of the element, and that further rotation is precluded. If however a second series of spherical bodies, as indicated at 2' and 3' Fig. 3 are arranged on the element so that the action of such additional bodies will commence at the moment the balance of the original series is secured, additional or further rotation of the element may be had.

In Fig. 4 the invention is illustrated in a more perfect manner for commercial use, the element 19 being here shown as a shaft or rod mounted at the respective ends of a casing 23 in suitable ball bearings, the casing being adapted to be arranged in the tank and open, as at 25 to the liquid of the tank.

The rotating bodies for the element are here shown as sections of rectangular form wound helically about the element. Three such helical portions are shown, as 16, 17 and 18, which portions are identical one to another and each substantially a complete spiral. These helical portions are fixed to the element 19 and so relatively arranged that the second helicoid 17, enters its active period before the first one 16 is entirely immersed, the third one 18 similarly entering its active period before the second one 17 is completely immersed. In this manner a complete revolution of the element 19 is secured under full immersion, and experience has shown that the operation is very regular. The helicoid bodies are each perfectly balanced, beginning and ending with a plane determined by the level of the liquid in the moment said liquid is commencing or finishing its action on such body.

The element 19 is extended as a stud 20, to which is fixed an indicator 21 operating over a graduated dial 22, in order to visually indicate the liquid level. The casing 23 may if desired be closed at the upper end by a transparent disk 23', held in position by a ring 24.

The casing 23 serves to isolate the level indicating apparatus from temporary variations of such level incident to the fluid tank being subjected to jars or the like, as when in use on a motor vehicle. The effect of temporary level fluctuations in the fluid may be still further controlled by the location of spaced disks 26 at the lower portion of the casing, as will be apparent.

The casing 23, and therefore the element 19 is to be arranged in the tank at an incline to the fluid level, as described in connection with the element 1, and if desired the tank may have an offset to receive the lower end of the element in order that the level indications by the element may be had from the normal bottom of the tank.

Having thus described the invention, what we claim as new, is:—

1. A fluid level indicating apparatus comprising an element mounted for rotation on an axis inclined to the level of the fluid, and buoyant members carried by the element to be successively immersed as the fluid level changes, said members varying the state of equilibrium of the element in accordance with the number thereof immersed.

2. In an apparatus for indicating fluid level variations, a rotative element inclined to the level of the fluid, buoyant bodies arranged on said element in different radial planes to effect the equilibrium of the element as such bodies are immersed on the change of fluid level.

3. In an apparatus for indicating fluid level variations, a rotative element inclined to the level of the fluid, and a series of buoyant bodies arranged on the element in spiral relation lengthwise the element.

4. In an apparatus for indicating fluid level variations, a rotative element inclined to the level of the fluid, and a series of buoyant bodies arranged on the element in spiral relation lengthwise the element, and means for indicating the rotative movement of the element.

In testimony whereof we affix our signatures.

LEON DE VRIENDT.
LOUIS DE VRIENDT.